(12) United States Patent
Hilgers

(10) Patent No.: US 7,640,790 B2
(45) Date of Patent: Jan. 5, 2010

(54) METHOD FOR OPERATING A HYDROGEN TEST LEAK UNIT

(75) Inventor: Heike Hilgers, Bergisch Gladbach (DE)

(73) Assignee: Inficon GmbH (DE)

( * ) Notice: Subject to any disclaimer, the term of this patent is extended or adjusted under 35 U.S.C. 154(b) by 235 days.

(21) Appl. No.: 10/575,385

(22) PCT Filed: Oct. 30, 2004

(86) PCT No.: PCT/EP2004/012334

§ 371 (c)(1),
(2), (4) Date: Mar. 22, 2007

(87) PCT Pub. No.: WO2005/047844

PCT Pub. Date: May 26, 2005

(65) Prior Publication Data

US 2007/0261476 A1 Nov. 15, 2007

(30) Foreign Application Priority Data

Nov. 13, 2003 (DE) .................................. 10353033

(51) Int. Cl.
*G01M 3/04* (2006.01)
(52) U.S. Cl. ....................................................... 73/40.7
(58) Field of Classification Search ................... 73/40.7
See application file for complete search history.

(56) References Cited

U.S. PATENT DOCUMENTS 5,049,168 A * 9/1991 Danielson ........................ 95/31
6,815,107 B2 * 11/2004 Inai et al. ...................... 429/22

FOREIGN PATENT DOCUMENTS

| DE | 101 22 733 A1 | 11/2002 |
| EP | 0 395 965 A2 | 11/1990 |
| EP | 0 503 925 A1 | 9/1992 |
| WO | 02/47189 A1 | 6/2002 |

OTHER PUBLICATIONS

Table from "Polymer Handbook" containing Permeation Coefficients of Various Polymers 851-886.*

* cited by examiner

*Primary Examiner*—Hezron Williams
*Assistant Examiner*—Mark Shabman
(74) *Attorney, Agent, or Firm*—Marjama Muldoon Blasiak & Sullivan LLP

(57) ABSTRACT

For operating a hydrogen test leak unit including a chamber defined by a membrane, a test gas mixture of hydrogen and an added gas is used. The added gas has a permeation coefficient relative to the material of the membrane ranging between 50% and 200% of that of hydrogen. In this manner, demixing of the test gas mixture is limited and significant concentration variations in the chamber are prevented. Preferably, helium is used as added gas.

4 Claims, 2 Drawing Sheets

METHOD FOR OPERATING A HYDROGEN TEST LEAK UNIT

FIELD OF THE INVENTION

The invention relates to a method for operating a hydrogen test leak unit comprising a chamber defined by a membrane, into which chamber a test gas mixture of hydrogen and at least one added gas is introduced.

BACKGROUND OF THE INVENTION

Test leak units are used for calibrating leakage flow meters. A test leak unit comprises a container in which a volume of a test gas or a test gas mixture is kept at a controlled pressure. The chamber includes an outlet connected to a capillary or any other defined test leak leading into the surroundings. For pressure control purposes, the chamber comprises a membrane which is supported by a spring, and which, upon deflection, actuates a control valve which switches on and off a gas-supplying pressure source.

Hydrogen may not be used as a pure gas in test leak units due to its explosiveness. Therefore, normally an oxygen-free hydrogen/nitrogen mixture is used as a test gas mixture (forming gas). However, the membrane sealing the chamber of the pressure control valve is not gas-impermeable. It rather offers different permeabilities to different gases. Consequently, hydrogen escapes more quickly from the chamber than nitrogen such that the nitrogen concentration in the chamber increases. Normally, the test gas mixture comprises 95% $N_2$ and 5% $H_2$. The hydrogen content can amount to up to 10%. This leads to an explosion risk.

SUMMARY OF THE INVENTION

It is an object of the invention to provide a method for operating a Hydrogen test leak unit which offers a high time constancy of the leak rate.

According to the invention, a gas is selected as an "added gas" which has a permeation coefficient relative to the material of the membrane ranging between 50% and 200% of that of hydrogen.

The invention is based on the idea that the components of the test gas mixture should have approximately the same permeation coefficients relative to the membrane material in order to prevent demixing due to permeation. The permeation coefficients depend to a large extent, but not exclusively, on the molecule size. The hydrogen molecule is relatively small and generally has relatively high permeation coefficients. This applies, mutatis mutandis, to helium. On the other hand, it has been found that even relatively large molecules, such as $CO_2$, $CH_4$ or $C_2H_6$, may offer a high permeability.

Helium has turned out to be a particularly suitable gas to be added to hydrogen. Experiments have shown that permeation through a membrane proceeds at essentially the same rate for hydrogen and helium. This combination offers the advantage that the hydrogen content can be reduced to approximately 5%. This is of importance with regard to hazardous substance categories. Another boundary condition requires that the useful life of test leak units should be one year. So far, realization of a hydrogen content of 5% has not been feasible since too much gas escaped through the required bypass capillary, and it has not been possible to comply with the useful life.

Suitable gases to be added are helium (He), carbon dioxide ($CO_2$), methane ($CH_4$) and ethane ($C_2H_6$). This list is however not complete.

The gas to be added should be oxygen-free to prevent it from forming, together with hydrogen, an explosive mixture. This is however not a necessary condition. By reducing the hydrogen content, the explosiveness of the test gas mixture can be decreased.

BRIEF DESCRIPTION OF THE DRAWINGS

An embodiments of the invention will now be described in greater detail with reference to the drawings in which.

DETAILED DESCRIPTION

Figure 1:
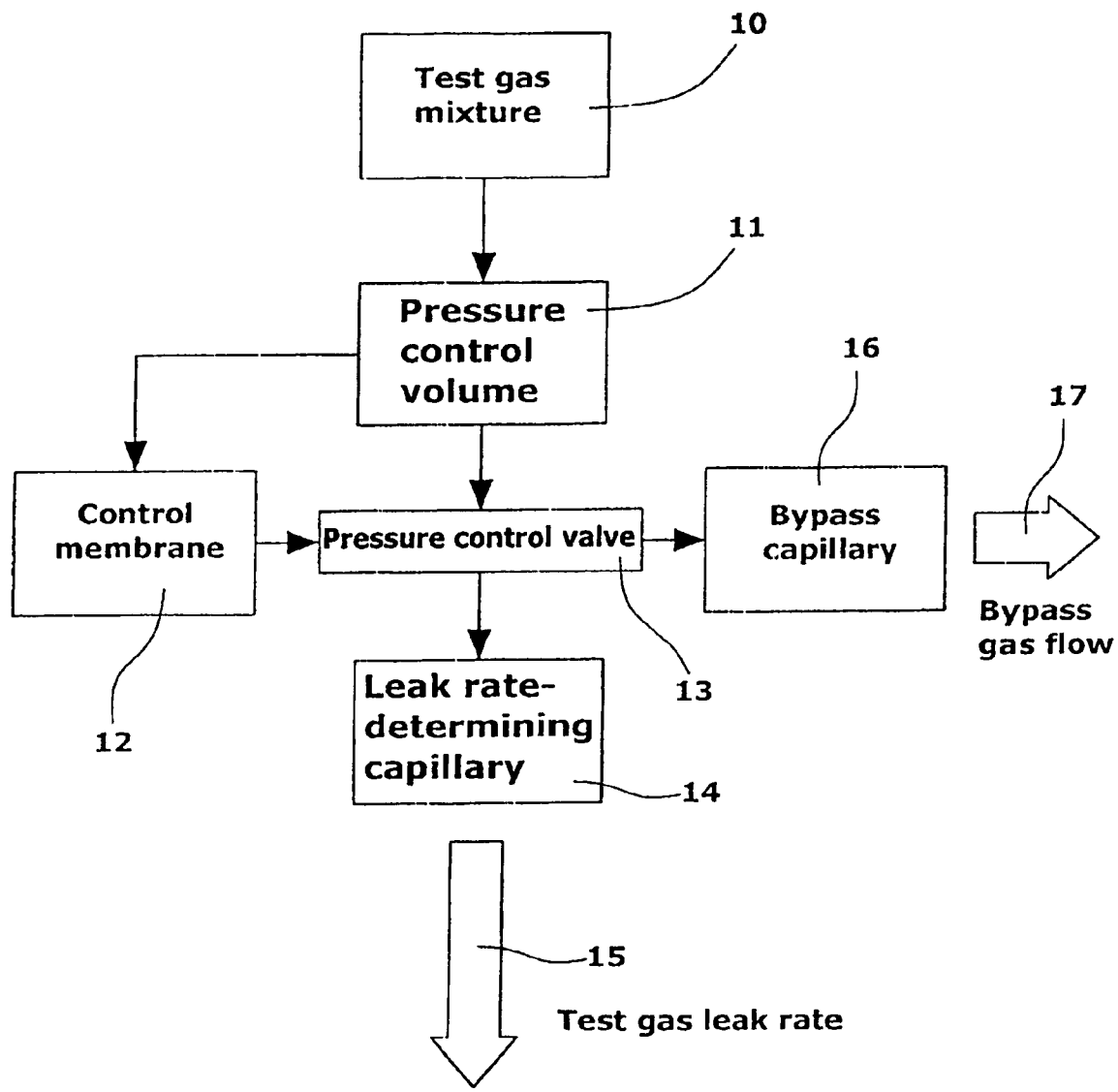
FIG. 1 shows a functional diagram of the hydrogen test leak unit.

As shown in FIG. 1, a test gas mixture 10 is introduced into a pressure control volume 11. The pressure control volume 11 comprises a pressure reducing valve provided with a control membrane 12. A pressure control valve 13 adjusts, with the aid of the control membrane 12, the pressure in the pressure control volume 11 to a constant value. The pressure control valve is connected with a leak rate-determining capillary 14 from which the leakage flow 15 escapes at the test gas leak rate.

The pressure control volume 11 or the pressure control valve 13 is connected with a bypass capillary 16 which leads a bypass flow 17 into the surroundings for the purpose of ensuring a permanent flow through the pressure control volume 11 to prevent demixing.

Figure 2:
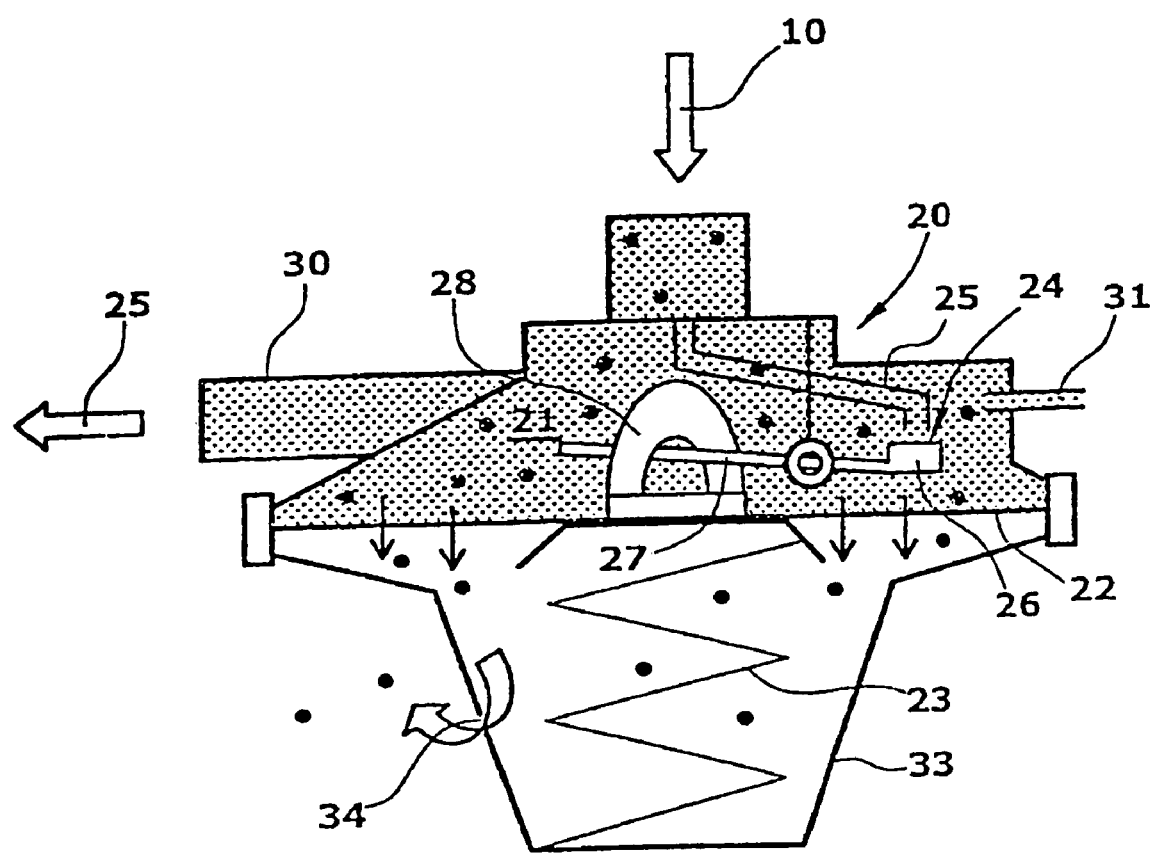
FIG. 2 shows a schematic configuration of the hydrogen test leak unit.

FIG. 2 shows the pressure controller 20 to which the test gas mixture 10 is supplied. The pressure controller 20 comprises a chamber 21 into which the test gas mixture is introduced. This chamber is sealed with a membrane 22. The membrane 22 is made from an elastomeric material. The membrane 22 is supported by a spring 23 which counteracts the pressure prevailing in the chamber 21. The pressure control valve 24 comprises a duct 25 for delivering the highly pressurized test gas mixture into the chamber 21. The outlet of the duct 25 is opened and closed by a movable valve element 26. Via a rod 27 defining a two-arm lever, the valve element 26 is connected with a coupling means 28 which connects one of the lever arms with the membrane 22. The deflection movements of the membrane 22 cause the pressure control valve 24 to be opened or closed. In this manner, a pressure corresponding to the force of the spring 23 is adjusted and maintained in the chamber 21.

FIG. 2 further shows the test leak outlet 30 which is connected with a leak rate-determiningm capillary (not shown) leading to the surroundings.

Further, a bypass capillary 31 is provided at the chamber 21, which bypass capillary permanently leads a leak flow into the surroundings.

The space below the membrane 22 is defined by a container 33 which supports the spring 23 and comprises a vent opening 34.

The small dots depicted pictorially in FIG. 2 represent the mixed-gas volume and the larger dots represent the hydrogen molecules. The hydrogen molecules diffuse through the membrane 22 out of the chamber 21 and travel through the vent opening 34 into the surroundings.

The membrane 22 is a polymeric membrane. In one embodiment, the membrane is made from polybutadiene-co-acrylonitrile (Perbunan 18). In another embodiment, the membrane is made from 73/27 Perbunan.

The following table shows the permeation coefficient P for the stated membrane materials. In the table given below (from Yasuda, H., Stannet, V.: Polymer Handbook, J. Wiley & Sons, New York, 1975), the permeation coefficient P has the following dimension $$[cm^3(STP) cm\, cm^{-2} s^{-1} (cm\, Hg)^{-1}]$$

TABLE

| Membrane material | | $P \times 10^{10}$ |
|---|---|---|
| Poly(butadiene-co-acrylonitrile) 80/20 | He | 16.9 |
| | $H_2$ | 25.2 |
| | $N_2$ | 2.52 |
| | $O_2$ | 8.16 |
| | $CO_2$ | 63.1 |
| 73/27 (Perbunan) | He | 12.2 |
| | $H_2$ | 15.9 |
| | $N_2$ | 1.06 |
| | $O_2$ | 3.85 |
| | $CO_2$ | 30.8 |
| | $C_2H_2$ | 24.9 |
| | $C_3H_8$ | 77.7 |

Depending on the membrane material, the permeation coefficient P for hydrogen is 25.2 or 15.9. The gas to be added is selected such that its permeation coefficient ranges between 50 and 200% of that of hydrogen. For this purpose, other gases which are not indicated in the table can also be used as added gases. Preferably, the stated range of the coefficient lies between 50% and 150%.

I claim:

1. A method for operating a hydrogen test leak unit comprising the steps of:
    disposing an elastomeric membrane into a chamber of the hydrogen test leak unit;
    introducing a test gas mixture of hydrogen and at least one added gas wherein the added gas has a permeation coefficient (P) relative to the material of said elastomeric membrane ranging between 50% and 200% of that of hydrogen;
    maintaining a constant pressure within said chamber through the movement of said elastomeric membrane; and
    allowing said test gas mixture to exit said chamber through a test leak outlet without passing through said membrane.

2. The method according to claim 1, wherein at least one of the group comprising helium, carbon dioxide and methane is selected as the added gas.

3. The method according to claim 1, wherein the added gas is oxygen-free.

4. The method according to claim 1, wherein the hydrogen content of the test gas mixture is lower than 10%.

* * * * *